United States Patent Office 3,297,534
Patented Jan. 10, 1967

3,297,534
METHOD FOR HYPERIMMUNIZING HOGS AGAINST HOG CHOLERA AND SERUM PRODUCT
Robert M. Scott, Sioux Falls, S. Dak., assignor to The Dow Chemical Company, Midland, Mich., a corporation of Delaware
No Drawing. Filed Apr. 26, 1963, Ser. No. 276,098
2 Claims. (Cl. 167—80)

This invention is concerned with a novel method for hyperimmunizing hogs against hog cholera and is particularly directed to such a method employing tissues other than blood as a source of virus and to the resulting improved method for the production of anti-hog cholera serum.

Anti-hog cholera serum products are among the most widely used serum products in the agricultural economy of the world. Such products are now prepared by hyperimmunizing hogs employed as a source of serum. Hyperimmunization has usually been accomplished by administering a relatively massive dose of virulent hog cholera virus intravenously to hogs which are already naturally immune or artifically immunized to hog cholera. Such operations have employed virus blood taken from pigs acutely sick with hog cholera. Effective hyperimmunization has been found to require several milliliters of defibrinated virus blood per pound of body weight of the immune hog employed as a serum producer.

Since it has been the practice to employ only the blood of the sick pigs as a source of virus inoculum, and since the infection renders the carcasses of the virus pigs unsuitable for any commercial use, hypering virus is an expensive commodity and it would be desirable to utilize other tissues from the sick hogs as a source of virus wherever possible. However, up to the present, it has been considered dangerous to employ tissues other than defribrinated blood for administration to the serum hogs via the intravenous route. It has been found, for example, that the injection of virus extracts from the kidneys or lungs of cholera-infected pigs into immune hogs resulted in the death of the latter.

It is an object of the invention to provide a novel method for hyperimmunizing hogs against hog cholera. It is a further object to provide such a method utilizing tissues other than blood either alone or in combination with blood as the source of immunizing virus. Other objects will become apparent from the following specification and claims.

In accordance with the present invention, it has been discovered that extracts of spleen and liver tissue from virus hogs sacrificed at the height of infection with hog cholera can be advantageously employed as active antigenic agents for intravenous inoculation into hogs immune to hog cholera for the purpose of evoking a hyperimmune state in such inoculated hogs. Surprisingly, it has been found that extracts from spleen and liver of infected hogs can be employed as a source of virus for intravenous inoculation without causing undesirable reactions or death of the inoculated hogs. Further, it has been found that such extracts are highly effective for evoking the hyperimmune response even though the titer of such extracts by conventional methods indicates a considerably lesser content of disease-producing virus than is contained in defibrinated blood from the same hogs.

In carrying out the invention, pigs which are not immune to hog cholera are inoculated with virulent hog cholera virus in the usual fashion and sacrificed at the height of the disease. The blood from such pigs may be used to produce hypering virus in conventional fashion. The spleens and/or livers of said pigs are removed under aseptic conditions and trimmed to remove fat and extraneous tissue. The resulting tissue is minced or finely ground with sterile instruments and the resulting minced or ground tissue is suspended in 5 to 10 parts of a cold, aqueous physiological salt solution, such as 0.85 percent saline solution, for each part of tissue. Preferably, the resulting mixture is further milled or ground in a suitable apparatus such as a homogenizer to accomplish maximal release of virus from the tissue cells. Thereafter, the suspension is freed of solids by conventional steps such as settling and filtration, and the extract is freed of any bacterial contamination by passage through a sterile bacteriological filter.

The spleen or liver extract produced as set forth above is suitable for replacing all or part of the conventional virus blood employed for hyperimmunization of hogs for the production of anti-hog cholera serum. Effective hyperimmune anti-serum has been produced when about 1 milliliter of spleen extract or liver extract is administered intraveneously per pound of hog body weight to previously immunized hogs. Good results are obtained when from about 1 to about 3 milliliters of spleen extract is so administered per pound of hog body weight or, alternatively, when from about 0.5 to 1 part or more of one of said extracts in admixture with 2 to 3 parts of conventional virus blood is used in the hyperimmunization process. In general, the use of spleen extract is preferred in either mode of operation.

The following examples illustrate the invention but are not to be construed as limiting.

Example 1

Non-immune pigs were inoculated with virulent virus of hog cholera and were sacrificed by bleeding at the height of the disease. The blood obtained was defibrinated in conventional fashion to produce virus blood for use in hyperimmunization. The spleens of the pigs were removed aseptically, trimmed under aseptic conditions to remove fat and extraneous tissue, and finely ground through a sterilized meat grinder. The ground spleen tissue was diluted with 9 parts of cold, aqueous 0.85 percent saline solution for each part of spleen tissue and the resulting mixture processed for two minutes in an Eppenbach homogenizer. The resulting suspension was drained into sterile containers and allowed to settle for 30 minutes. During the settling period, solid tissue fragments settled into the lower portion of the container and the supernatant fluid portion was drawn off. The recovered fluid was strained through three layers of 90-mesh gauze and thereafter through a sterile bacteriological filter. The sterile filtrate, hereinafter called spleen extract, contained a high proportion of viable hog cholera virus and was suitable for immediate use in hyperimmunization or for storage under refrigeration for subsequent use.

Example 2

Hogs which had been immunized by vaccination against hog cholera at least 90 days previously were injected intravenously with 3.5 milliliters of a virus mixture per pound of hog body weight. Said mixture consisted of 2.5 volumes of conventional defibrinated virus blood from non-immune pigs inoculated with virulent hog cholera virus together with 1 volume of spleen extract prepared by the method of Example 1.

In a similar fashion, others of the immune hogs were inoculated intranvenously with 2.5 milliliters of the 10 percent spleen extract of Example 1 per pound of body weight, or with 2.5 milliliters of standard hypering virus blood per pound of body weight. After an incubation period of about 14 days, blood was drawn from the inoculated hogs and anti-hog cholera serum prepared therefrom in conventional fashion. Each of the resulting serum products was tested by inoculation into non-immune pigs in graduated dosages and said pigs were simultaneously challenged with virulent hog cholera virus. Five pigs were inoculated with each dosage level. All the treated pigs were thereafter maintained in isolation areas and observed for development of symptoms of hog cholera. The results are summarized in the following table wherein the column headed "50% P.E." gives the 50 percent protection endpoints, that is, the calculated number of milliliters of the serum required to protect 50 percent of treated pigs from developing the disease. Serum A was produced with the above virus mixture, serum B with virus blood alone, and serum C with spleen extract alone.

| Serum | Dosage, Milliliters | Number of Pigs: | | 50% P.E., Milliliters |
|---|---|---|---|---|
| | | Well | Sick | |
| A | 1.5 | 1 | 4 | |
| A | 3.0 | 3 | 2 | 2.68 |
| A | 6.0 | 4 | 1 | |
| A | 12.0 | 5 | 0 | |
| B | 1.5 | 1 | 4 | |
| B | 3.0 | 2 | 3 | 3.00 |
| B | 6.0 | 5 | 0 | |
| B | 12.0 | 5 | 0 | |
| C | 1.5 | 2 | 3 | |
| C | 3.0 | 5 | 0 | 1.78 |
| C | 6.0 | 5 | 0 | |
| C | 12.0 | 5 | 0 | |

*Example 3*

Following the procedure of Example 2, immune hogs were hyperimmunized by intravenous injection of 3.5 milliliters of virous mixture per pound of hog body weight employing the mixture of 2.5 volumes of virus blood with 1 volume of 10 percent spleen extract. This operation was carried out on a full scale commercial production basis. The resulting serum was titered as in Example 2 and found to have a 50 percent protection endpoint of 2.12 milliliters per pig.

Similar high titer anti-hog cholera serum was produced in commercial quantities employing a hypering dose of 3.25 milliliters of a virus mixture per pound of hog body weight. In this instance, the virus mixture consisted of 2.5 parts by volume of conventional defibrinated virus blood from pigs sick with hog cholera together with 0.75 parts by volume of 10 percent spleen extract prepared by the method of Example 1.

*Example 4*

The method of Example 1 was followed except that the livers, rather than the spleens, of the infected pigs were employed for producing the virus suspension. The resulting product, hereinafter designated 10 percent liver tissue extract, was compared to the 10 percent spleen extract of Example 1 as a source of virus for hyperimmunization of hogs. In this operation, the general method of Example 2 was followed except that one serial of hogs was hypered with one milliliter of 10 percent liver tissue extract per pound of hog body weight and another serial was hypered with 1 milliliter of the 10 percent spleen extract per pound of body weight. The serum was harvested and tested for potency as in Example 2. The resulting serum products had 50 percent protection endpoints of 8.49 milliliters for that produced with 10 percent liver tissue extract, and 4.45 milliliters for that produced with the 10 percent spleen extract. There was no evidence of toxicity resulting from the administration of either of the serum products.

*Example 5*

Determinations were carried out to ascertain the content of virulent virus in spleen extract prepared as in Example 1 in comparison with standard hypering virus blood. The virus blood and spleen extract were both prepared from the same group of pigs acutely sick with hog chlorea. Serial dilutions of the virus blood were made to give concentrations of $10^{-8}$, $10^{-7}$ and $10^{-6}$. The 10 percent spleen extract was diluted to give concentrations of $10^{-8}$, $10^{-7}$, $10^{-6}$ and $10^{-5}$, based on the original 10 percent extract. Each dilution was injected into three hog cholera-susceptible pigs and each such group of three pigs was housed in a separate pen in a hog cholera-free area and observed for the onset of hog cholera symptoms. Temperatures of the pigs were taken daily with precautions against carrying infection from one group to another. It was observed that all animals that received the regular hypering virus blood, even at a dilution of $10^{-8}$, sickened with hog cholera. Of the pigs injected with the spleen suspension dilutions, all those injected with the $10^{-8}$ and $10^{-7}$ concentrations failed to sicken and 2 of those injected with the $10^{-6}$ concentrations failed to sicken. The three pigs receiving the $10^{-5}$ concentration and one of those injected with the $10^{-6}$ concentration sickened with hog cholera.

Similar determinations with the liver tissue extract of Example 4 indicated that the liver tissue extract contained somewhat more virulent virus than the spleen extract.

It is surprising that although the above-described test indicates a considerably lower concentration of active virulent hog cholera virus in the spleen extract, as compared to conventional virus blood, nevertheless the spleen extract had a high degree of antigenicity for producing hyperimmunity as evidenced by the titers of serum produced therewith as in Example 2.

I claim:

1. A process for preparing an anti-hog cholera product which comprises the steps of securing spleen tissue from a pig sick with hog cholera, preparing a fine suspension of said tissue in aqueous saline solution in the proportions of from 5 to 10 parts of said solution per part of said tissue, separating the resulting aqueous extract from suspended solid matter, filtering said extract with the final step of filtration consisting of passage of the extract through a sterile bacteriological filter, injecting a hyperimmunizing dose of said filtered extract intravenously into a hog cholera-immune hog and subsequently withdrawing blood from said hog.

2. A process according to claim 1 wherein the filtered aqueous extract is mixed with hog cholera virus blood in the proportions of from about 0.5 to 1 part by volume of said extract to 2 to 3 parts by volume of said virus blood and a hyperimmunizing dose of the resulting mixture is injected intravenously into the hog cholera-immune hog.

References Cited by the Examiner

Agricultural Information Bulletin No. 241, January 1962, and Supplement March 1962 (attached), "History of Hog Cholera Research in the U.S. Dept. of Agriculture, 1884–1960," Agricultural Research Service, U.S. Dept. of Agr., Bulletin No. 241, pp. 12–17, 20–28, 35–36; Supplement of March 1962, pp. 6, 7, 71–75, 79–80 and 97.

Agricultural Research Service Pamphlet, "9C.F.R., Parts 101–132," pp. 1, 2, 17–37, June 1961.

LEWIS GOTTS, *Primary Examiner.*

SHEP K. ROSE, *Assistant Examiner.*